United States Patent [19]

Chiba

[11] Patent Number: 5,218,598
[45] Date of Patent: Jun. 8, 1993

[54] DISC DRIVING APPARATUS WITH MAGNETIC MEANS FOR PREVENTING AXIAL MOVEMENT

[75] Inventor: Yoshio Chiba, Kanagawa, Japan
[73] Assignee: Sony Corporation, Tokyo, Japan
[21] Appl. No.: 661,483
[22] Filed: Jan. 29, 1991

[30] Foreign Application Priority Data

Jan. 29, 1990 [JP] Japan .................................. 2-018223

[51] Int. Cl.⁵ ...................... G11B 23/00; G11B 25/00
[52] U.S. Cl. ................................ 369/263; 369/264; 192/84 PM
[58] Field of Search .................. 192/84 PM; 369/258, 369/263, 261, 263, 264; 360/104, 106

[56] References Cited

U.S. PATENT DOCUMENTS

| | | | |
|---|---|---|---|
| 2,275,839 | 3/1942 | Boehne | 192/84 PM |
| 2,591,463 | 4/1952 | Parker | 192/84 PM |
| 4,475,184 | 10/1984 | Cooper et al. | 369/263 |
| 4,581,667 | 4/1986 | Gerfast | 369/99.12 |
| 4,726,690 | 2/1988 | Iwama et al. | 359/200 |
| 4,730,299 | 3/1988 | Kamoshita et al. | 369/264 |
| 4,731,777 | 3/1988 | Yoshitoshi et al. | 369/263 |
| 4,874,976 | 10/1989 | Ohsawa et al. | 360/97.01 |
| 4,951,277 | 8/1990 | Masunaga et al. | 369/270 |
| 5,050,158 | 9/1991 | Kitada et al. | 369/270 |

FOREIGN PATENT DOCUMENTS

| | | |
|---|---|---|
| 0186195 | 7/1986 | European Pat. Off. . |
| 1797414 | 2/1972 | Fed. Rep. of Germany . |
| 2588991 | 4/1987 | France . |
| 62-80318 | 4/1987 | Japan . |

Primary Examiner—Eugene R. LaRoche
Assistant Examiner—Michael C. Kessell
Attorney, Agent, or Firm—Hill, Steadman & Simpson

[57] ABSTRACT

A disc driving apparatus comprises a motor, a turntable which is rotated by a driving force of the motor and supports a disc on one side thereof, a fixed supporting portion for rotatably supporting the turntable, and magnetic means for always generating a predetermined magnetic attracting or repulsive force between the other side of the turntable and the fixed supporting portion which faces the other side of the turntable. A unidirectional urging force is always applied to the turntable by the magnetic means in the axial direction, so that even if an external vibration exists, when a force which is applied to the turntable by the vibration is equal to or less than the urging force, the turntable does not move in the axial direction. Thus, the interval between the disc supported on the turntable and a pickup does not change by the vibration, and an erroneous recording or reading of a signal can be avoided.

2 Claims, 4 Drawing Sheets

DISC DRIVING APPARATUS WITH MAGNETIC MEANS FOR PREVENTING AXIAL MOVEMENT

BACKGROUND OF THE INVENTION

1. Field of the Invention

The present invention relates to a novel disc driving apparatus.

2. Description of the Prior Art

In a recording and reproducing apparatus using a recording medium disc such as a compact disc player (hereinafter, referred to as a "CD player"), it is necessary to accurately keep an interval between the recording medium disc and the pickup for recording and/or reading a signal to/from the recording medium disc.

Although it is obviously possible to follow such a change in interval by the focusing servo and the tracking servo of the pickup to a certain degree, if a sudden change occurs, the servo cannot follow and an erroneous reading of the signal or the like occurs. For instance, in the CD player, what is called a sound jumping phenomenon occurs.

Therefore, in the recording and reproducing apparatus of a recording medium disc, it is important that the position for the fixed side of the turntable which supports the recording medium disc does not fluctuate by an external vibration or the like.

OBJECT AND SUMMARY OF THE INVENTION

It is, therefore, an object of the invention to provide a novel disc driving apparatus having a turntable which supports a recording medium disc and is rotated by a motor, wherein the turntable is not shaken in the axial direction by an external vibration and the vibration resistance is improved.

According to an aspect of the invention, there is provided a disc driving apparatus comprising:

a motor;

a turntable which is rotated by a driving force of the motor and supports a disc on the side of one surface;

a fixed supporting portion for rotatably supporting the turntable; and magnetic means for always generating a predetermined magnetic attracting or repulsive force between the other surface side of the turntable and the fixed supporting portion which faces the other surface side of the turntable.

DETAILED DESCRIPTION OF THE PREFERRED EMBODIMENTS

Figure 1:
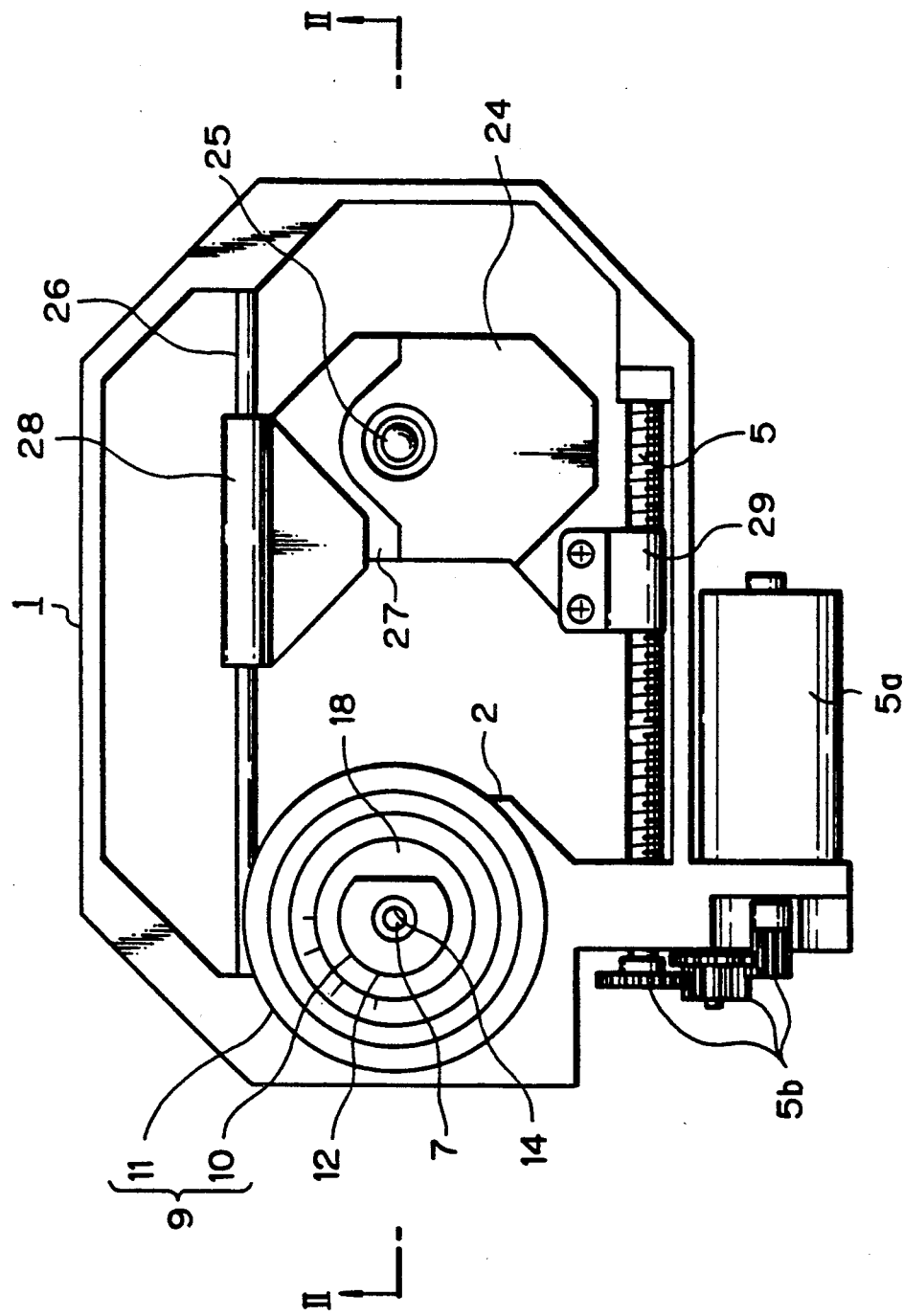
FIG. 1 is plan view of the main section of an embodiment a disc driving apparatus of the invention.

A disc driving apparatus of the invention will be described in detail hereinbelow in accordance with an embodiment shown in the drawings in which the invention is applied to a CD player.

a. Frame

Reference numeral 1 (FIGS. 1 and 2) denotes a frame which is supported on a mechanical chassis of a CD player (not shown). The frame has a rectangular frame-like shape which is almost longitudinal when it is seen in plan view.

Reference numeral 2 denotes a motor attaching portion provided at an almost central position of one end portion in the longitudinal direction of the frame 1. The motor attaching portion 2 has an almost circular shape in the plan view. A through hole 3 (FIG. 2) is formed in the central portion of the motor attaching portion 2.

Reference numeral 4 denotes an attaching concave portion formed on the upper surface of the motor attaching portion 2 on the side which is close to one end of the frame 1.

Reference numeral 5 denotes a ball screw whose both ends are rotatably supported along one of the side surfaces of the frame 1 which extend in the longitudinal direction. The ball screw 5 is used to move an optical pickup, which will be explained hereinafter, relative to the frame 1 in the longitudinal direction thereof. The rotation of a motor 5a fixed to the frame 1 is transferred to the ball screw 5 through a reduction gear train 5b, so that the ball screw 5 is rotated.

b. Spindle motor

Reference numeral 6 denotes a spindle motor using, for instance, a brush or brushless motor.

A rotary shaft 7 of the spindle motor 6 is upwardly projected. An upper end portion of a motor casing 8 is fixed to the lower surface of the motor attaching portion 2. The rotary shaft 7 penetrates through the hole 3 of the motor attaching portion 2 and projects to the upper surface side of the motor attaching portion 2.

c. Turntable

Reference numeral 9 denotes a turntable comprising a core portion 10 and a pan portion 11.

The core portion 10 is constructed by integratedly forming a large diameter portion 12 having a thick almost disk-like shape and a small diameter portion 13 which vertically extends from the central portion of the lower surface of the large diameter portion 12. A through hole 14 is formed in the center of the core portion 10.

On the other hand, a caulking projection 15 is formed under the lower surface of the large diameter portion 12 of the core portion 10. Further, a screw hole 16 which reaches from the outer peripheral surface of the large diameter portion 12 to the through hole 14 is formed. A screw 17 is threadably inserted into the screw hole 16.

Figure 4:
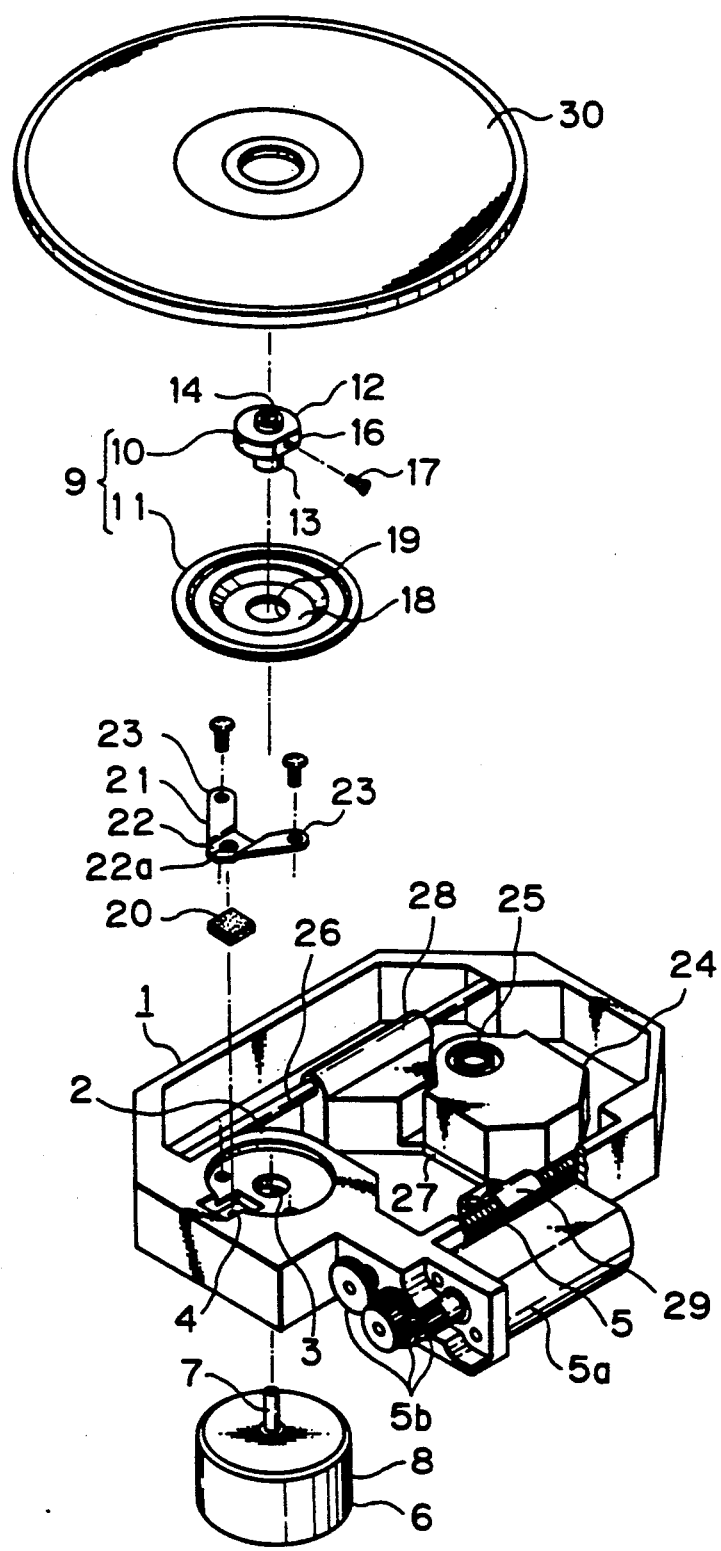
FIG. 4 is an exploded perspective view of the main section of the disc driving apparatus.

The pan portion 11 of the turntable is made of a ferromagnetic material. A shallow concave portion 18 is formed in the central portion of the pan portion 11. An attaching hole 19 having a diameter which is almost equal to an outer diameter of the caulking projection 15 is formed in the concave portion 18. The small diameter portion 13 of the core portion 10 and the caulking projection 15 are inserted into the attaching hole 19 of the pan portion 11 from the upper direction, as shown in FIG. 4. The caulking projection 15 is caulked toward the outside. Thus, the core portion 10 and the pan portion 11 are coupled and the turntable 9 is formed.

The rotary shaft 7 of the spindle motor 6 is fitted into the through hole 14 of the turntable 9 and the screw 17 is tightly fastened. The tip of the screw 17 is in pressure contact with the outer peripheral surface of the rotary shaft 7, so that the turntable 9 is coupled with the rotary shaft 7.

d. Magnet

Figure 2:
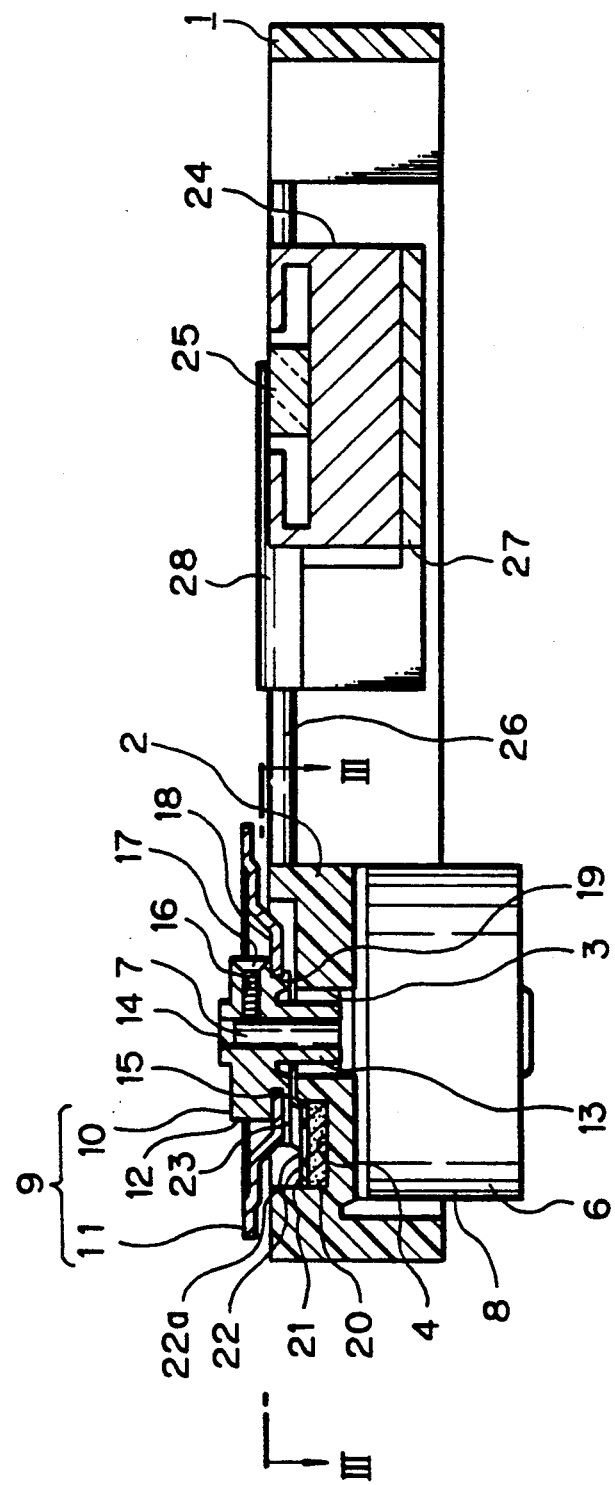
FIG. 2 is an enlarged cross sectional view taken along the line II—II in FIG. 1.
Figure 3:
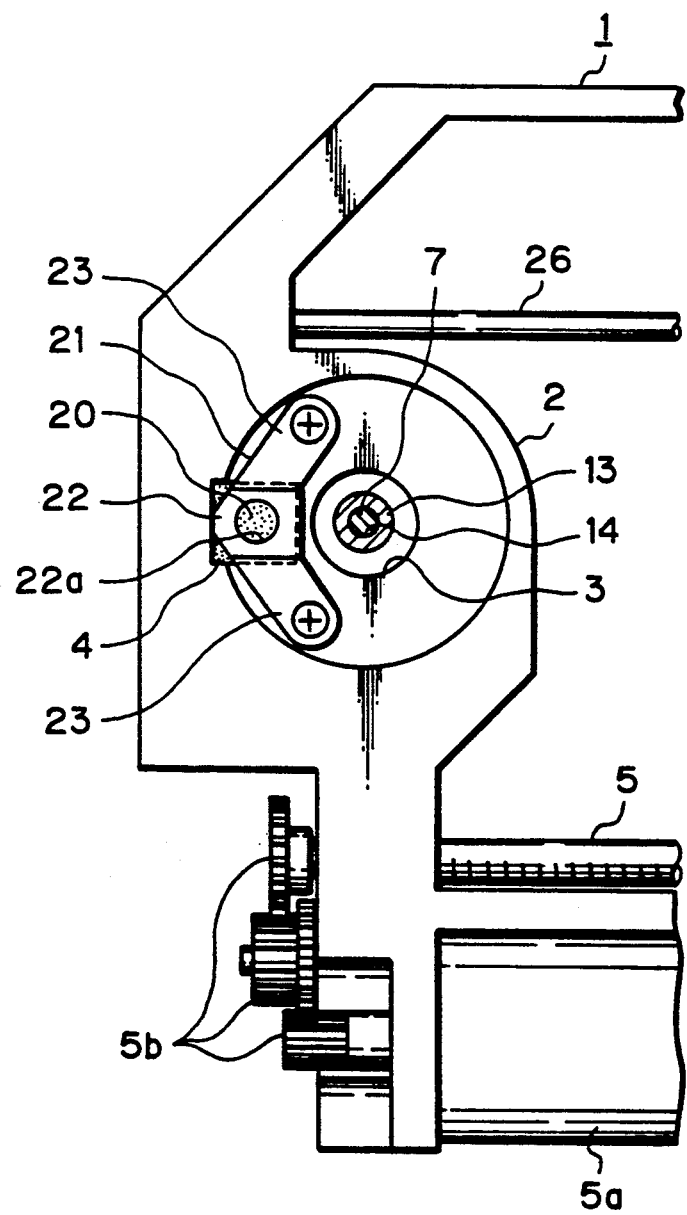
FIG. 3 is a cross sectional view taken along the line III—III in FIG. 2.

Reference numeral 20 denotes a permanent magnet which is fitted into the attaching concave portion 4 formed on the upper surface of the motor attaching portion 2, as shown in FIGS. 2-4.

Reference numeral 21 denotes an attaching metal fitting having an almost V shape in a plan view. The attaching metal fitting 21 comprises a central pressing portion 22 and attaching portions 23 which are projected from both sides of the pressing portion 22. A hole 22a is formed at the center of the pressing portion 22. The pressing portion 22 is put on the upper surface of the permanent magnet 20 fitted into the attaching concave portion 4. The attaching portions 23 are fixed to the motor attaching concave portion 2 by using screws. Thus, the permanent magnet 20 is prevented from dropping out from the attaching concave portion 4.

e. Optical pickup

Reference numeral 24 denotes an optical pickup which reads a signal recorded on a compact disc, which will be explained hereinafter, by a laser beam which is irradiated onto the compact disc through an objective lens 25. The optical pickup 24 is similar to the well-known pickup.

Reference numeral 26 denotes a guide shaft which is supported on the side opposite from the position where the ball screw 5 is arranged in the frame 1 so as to extend in parallel with the ball screw 5.

Reference numeral 27 denotes a supporting plate. The optical pickup 24 is supported to the upper surface of the supporting plate 27. Reference numeral 28 denotes a sleeve fixed to one side edge portion of the supporting plate 27. The guide shaft 26 is slidably inserted into the sleeve 28. Reference numeral 29 denotes a nut member fixed to the other side edge portion of the supporting plate 27. The ball screw 5 is threadably fitted into the nut member 29.

When the ball screw 5 rotates, the nut member 29 is moved along the ball screw 5, so that the optical pickup 24 is slid correspondingly.

f. Operation

The recording medium disc, for instance, a compact disc 30 is put on the turntable 9. The compact disc 30 is rotated by the rotation of the spindle motor 6. The optical pickup 24 moves at a position close to the recording surface of the compact disc 30 in a radial direction of the compact disc 30 by the rotation of the ball screw 5, thereby reading a signal from the compact disc 30.

In the above apparatus, since the pan portion 11, which is made of a magnetic material, of the turntable 9 is always attracted by the permanent magnet 20, a constant downward urging force is always applied to the turntable 9 and to the rotary shaft 7 of the spindle motor 6. Therefore, even if a small vibration occurs, the position of the turntable 9 does not shake.

In the above embodiment, the permanent magnet has been attached to the motor attaching portion end, and a part of the turntable has been made of a ferromagnetic material, thereby forming the magnetic means. However, the magnetic means of the invention is not limited to the above construction. For instance, it is also possible to attach a permanent magnet to the turntable and to provide a ferromagnetic material or a permanent magnet to a fixed side member which faces the permanent magnet. On the other hand, although a magnetic attracting force has been used in the embodiment as a magnetic force which acts between the turntable and the fixed side member, a magnetic repulsive force can be also used.

In the case of providing a permanent magnet on the fixed side member, the permanent magnet is preferably provided on the side away from the moving region of the pickup, as shown, because a leakage magnetic flux of the permanent magnet does not exert an influence on the pickup. However, the position of the permanent magnet is not limited to the above position.

Further, in the disclosed embodiment, the brush motor has been identified as an example of a spindle motor. However, the spindle motor is not limited to a brush type motor. Even when a motor of another type is used, the magnetic force can improve the vibration resistance.

The practical structure and shape shown in the above embodiment have been shown as a mere example when embodying the invention and the interpretation of the technical scope of the invention is not to be limited by them.

It will be apparent that various modifications and/or additions may be made in the apparatus of the invention without departing from the essential feature of novelty involved, which are intended to be defined and secured by the appended claims.

What is claimed is:

1. A disc driving apparatus comprising;
   a motor;
   a turntable which is rotated by said motor and which supports a disc on the surface of one side thereof;
   a fixed support for rotatably supporting said turntable and spaced from said turntable in an axial direction relative to the axis of rotation;
   magnetic means for always generating a predetermined magnetic attracting or repulsive force between the other side of said turntable, opposite the side with the disk, and said fixed support which faces the surface of said other side of said turntable, said magnetic force acting to prevent movement between said turntable and said fixed support in said axial direction; and
   a pickup for reading a signal from said disc on said turntable is movable in a radial direction of said disc and said magnetic means is located at a position remote from any position of said pickup entirely on the opposite side of said axis of rotation from said pickup.

2. A disc driving apparatus according to claim 1, wherein an attaching concave portion to enclose said magnetic is formed in said fixed support facing said other side of said turntable.

* * * * *